(12) United States Patent
Teshima et al.

(10) Patent No.: US 11,841,294 B2
(45) Date of Patent: Dec. 12, 2023

(54) DIAGNOSIS DEVICE, DIAGNOSIS SYSTEM, AND COMPUTER-READABLE MEDIUM

(71) Applicants: Ricoh Company, Ltd., Tokyo (JP); FANUC CORPORATION, Yamanashi (JP)

(72) Inventors: Yu Teshima, Kanagawa (JP); Yasuhiro Nakahama, Yamanashi (JP)

(73) Assignees: RICOH COMPANY, LTD., Tokyo (JP); FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/828,017

(22) Filed: Mar. 24, 2020

(65) Prior Publication Data

US 2020/0309642 A1 Oct. 1, 2020

(30) Foreign Application Priority Data

Mar. 29, 2019 (JP) ................. 2019-066262

(51) Int. Cl.
*G01M 99/00* (2011.01)
*G06Q 50/04* (2012.01)
(Continued)

(52) U.S. Cl.
CPC .......... *G01M 99/005* (2013.01); *G01H 17/00* (2013.01); *G05B 19/4065* (2013.01); *G06Q 50/04* (2013.01); *G05B 2219/50206* (2013.01)

(58) Field of Classification Search
CPC ...... G01M 99/005; G01M 7/00; G06Q 50/04; G01H 17/00; G01H 1/00; G05B 19/4065;
(Continued)

(56) References Cited

U.S. PATENT DOCUMENTS 10,732,606 B2\* 8/2020 Higashi ................ G05B 19/406
2012/0078670 A1\* 3/2012 Yamamura ......... G05B 19/4184
705/7.11
(Continued)

FOREIGN PATENT DOCUMENTS

CN 102915013 A 2/2013
CN 107533326 A 1/2018
(Continued)

OTHER PUBLICATIONS

Office Action dated Jun. 28, 2022 in Japanese Patent Application No. 2019-066262, 8 pages.
(Continued)

*Primary Examiner* — Regis J Betsch
(74) *Attorney, Agent, or Firm* — XSENSUS LLP

(57) ABSTRACT

A diagnosis device includes a first acquisition unit, a second acquisition unit, and an associating unit. The first acquisition unit is configured to acquire, from a machine tool, context information including at least a monitoring specifying number identifying a machining process. The second acquisition unit is configured to acquire detection information output from a detection unit installed for the machine tool. The associating unit is configured to associate the monitoring specifying number included in the context information acquired by the first acquisition unit and the detection information acquired by the second acquisition unit.

10 Claims, 13 Drawing Sheets

(51) Int. Cl.
*G01H 17/00* (2006.01)
*G05B 19/4065* (2006.01)

(58) Field of Classification Search
CPC ........... G05B 2219/50206; G05B 2219/37434; G05B 19/406; G05B 2219/32356; Y02P 90/30
See application file for complete search history.

(56) References Cited

U.S. PATENT DOCUMENTS

| | | | | |
|---|---|---|---|---|
| 2017/0308043 | A1* | 10/2017 | Inagaki | G05B 13/021 |
| 2017/0329303 | A1* | 11/2017 | Higashi | G05B 19/406 |
| 2018/0356282 | A1* | 12/2018 | Fukuda | G03G 15/00 |
| 2018/0364674 | A1* | 12/2018 | Kapila | G05B 19/27 |
| 2019/0129378 | A1* | 5/2019 | Mizuno | G05B 19/4065 |
| 2019/0179297 | A1* | 6/2019 | Kuroda | G06N 20/00 |
| 2020/0117166 | A1* | 4/2020 | Mizuno | G05B 19/4097 |
| 2020/0133230 | A1* | 4/2020 | Goto | G05B 19/4065 |

FOREIGN PATENT DOCUMENTS

| | | | | |
|---|---|---|---|---|
| CN | 108629423 | A | 10/2018 | |
| CN | 110347116 | A * | 10/2019 | ............ B23Q 17/00 |
| JP | 2005-011203 | A | 1/2005 | |
| JP | 2005-032279 | A | 2/2005 | |
| JP | 4087374 | | 5/2008 | |
| JP | 5955479 | B1 | 7/2016 | |
| JP | 2017-033346 | A | 2/2017 | |
| JP | 2017-120622 | A | 7/2017 | |
| JP | 6156566 | B2 | 7/2017 | |
| JP | 2018-156652 | | 10/2018 | |
| JP | 2019191733 | A * | 10/2019 | ............ E02F 9/264 |
| WO | 2017/111072 | A1 | 6/2017 | |
| WO | 2018/169069 | A1 | 9/2018 | |

OTHER PUBLICATIONS

Chinese Office Action dated Sep. 28, 2023, in corresponding Chinese Application No. 202010170968.4, 9pp.

* cited by examiner

DIAGNOSIS DEVICE, DIAGNOSIS SYSTEM, AND COMPUTER-READABLE MEDIUM

CROSS-REFERENCE TO RELATED APPLICATIONS

The present application claims priority under 35 U.S.C. § 119 to Japanese Patent Application No. 2019-066262, filed on Mar. 29, 2019. The contents of which are incorporated herein by reference in their entirety.

BACKGROUND OF THE INVENTION

1. Field of the Invention

The present invention relates to a diagnosis device, a diagnosis system, and a computer-readable medium.

2. Description of the Related Art

In machining such as cutting, grinding, and polishing to a work material in a machine tool such as a machining device, a technique identifies machining processes with sequence numbers and displays the maximum value, the average value, and the current value of a load torque in the machining process corresponding to each sequence number is known.

One example of the technique for monitoring a state of a motor, such as a load torque, is a numerical control device disclosed in Japanese Patent No. 4087374. This numerical control device has a load torque monitoring function for a feeding motor that drives a feeding shaft of a machine tool. The numerical control device includes: input means of inputting a sequence number of a block of a machining program in which the load torque of the feeding motor is not monitored; storing means of storing the input sequence number; detecting means of determining whether a command of a block that is currently executed in the machining program is a positioning command; comparing means of comparing the sequence number of the block that is currently executed in the machining program, and the stored sequence number; and monitoring means of monitoring the load torque of the feeding motor in the positioning operation if the detecting means has determined that the command of the block in execution is the positioning command and the comparing means has determined that the sequence number of the block that is commanded is not the same as the sequence number stored in the storing means.

However, the technique according to Japanese Patent No. 4087374 merely enables associating the sequence number with the torque load that can be acquired in the machine tool, and has a problem that the data output from an external sensor such as a vibration sensor that is provided independently and separately from the machine tool in order to detect the vibration or the like generated in the machine tool, that is, the data that is not the internal information of the machine tool and the sequence numbers that identify the machining processes (monitoring specifying numbers) cannot be associated with each other. There is another problem that the data including the vibration data cannot be associated with the sequence number in the analysis.

The present invention has been made in view of the above problems, and an object is to provide a diagnosis device, a diagnosis system, and a computer program that can associate the data output from the external sensor provided independently to the machine tool with the monitoring specifying number about the machining process, so that the data can be analyzed for each monitoring specifying number.

SUMMARY OF THE INVENTION

According to an aspect of the present invention, a diagnosis device includes a first acquisition unit, a second acquisition unit, and an associating unit. The first acquisition unit is configured to acquire, from a machine tool, context information including at least a monitoring specifying number identifying a machining process. The second acquisition unit is configured to acquire detection information output from a detection unit installed for the machine tool. The associating unit is configured to associate the monitoring specifying number included in the context information acquired by the first acquisition unit and the detection information acquired by the second acquisition unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
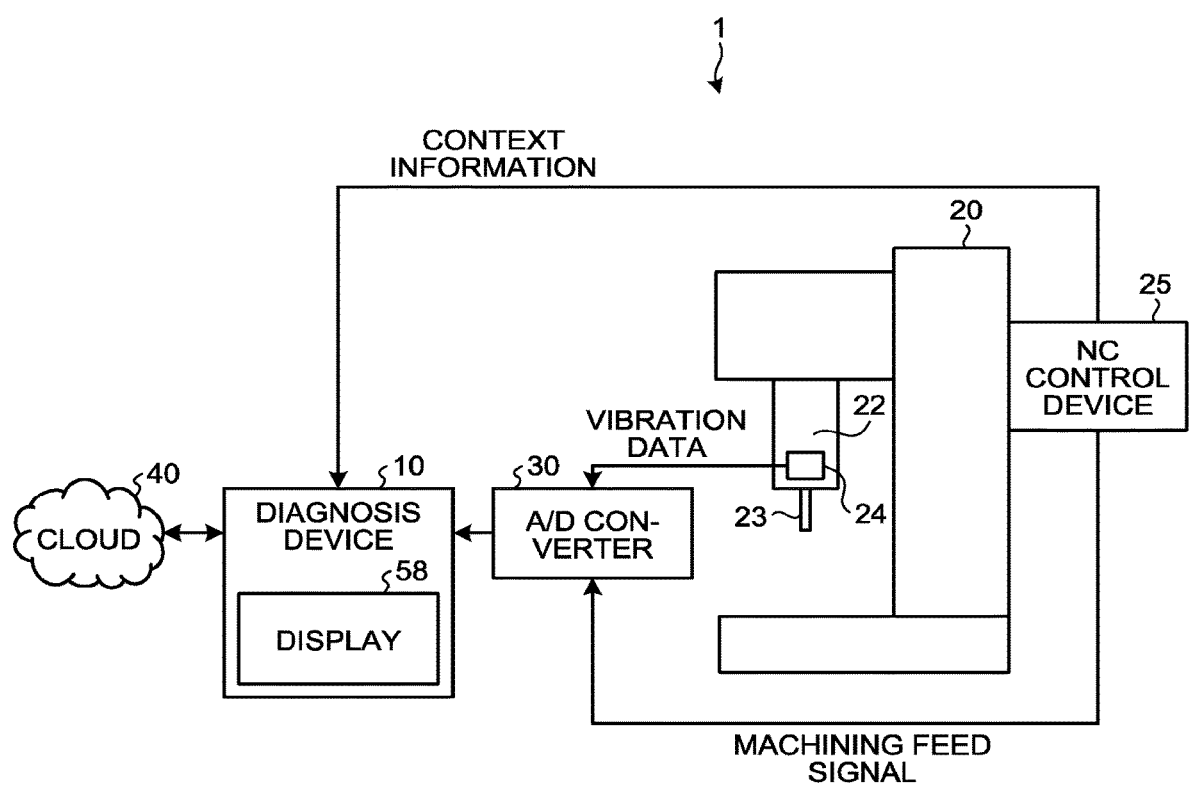
FIG. 1 is a diagram illustrating one example of an overall structure of a diagnosis system according to one embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

A diagnosis device, a diagnosis system, and a computer program according to the present invention are hereinafter described in detail with reference to the drawings. The present invention is not limited by the embodiment below, and the component in the embodiment below includes a component that is easily conceived by a person skilled in the art, that is substantially the same, and that is in what is called the equivalent range. Moreover, various omissions, replacements, changes, and combinations of the component are possible within the range not departing from the concept of the embodiment below.

Overall structure of diagnosis system FIG. 1 is a diagram illustrating one example of an overall structure of a diagnosis system according to one embodiment. With reference to FIG. 1, an overall structure of a diagnosis system 1 according to one embodiment is described.

As illustrated in FIG. 1, the diagnosis system 1 includes a diagnosis device 10, a machine tool 20, and an A/D converter 30.

The diagnosis device 10 is a device that receives vibration data generated in a machining cycle by the machine tool 20, and performs an analysis process such as a diagnosis as to whether there is an abnormality. The diagnosis device 10 receives the vibration data as a digital signal resulting from conversion in the A/D converter 30. The diagnosis device 10 includes a display 58 that displays the received vibration data. The diagnosis device 10 receives context information, which is described below, from an NC control device 25 of the machine tool 20, and receives a machining feed signal, which expresses that a machining process is currently performed in the machine tool 20, through the A/D converter 30. As illustrated in FIG. 1, the diagnosis device 10 can connect to a cloud 40 through a network and save the acquired vibration data and the like in the cloud 40. Note that the connection of the diagnosis device 10 to the cloud 40 is optional.

The machine tool 20 is used to machine, for example cut, grind, or polish a machining target using a tool. The machine tool 20 is one example of target devices to be diagnosed by the diagnosis device 10. The machine tool 20 is provided with a vibration sensor 24 that detects the vibration generated in the machining cycle, and includes a tool 23 that is held by a holder 22 and performs a machining process, such as cutting, grinding, or polishing, on the machining target, and the NC (Numerical Control) control device 25 that controls the operation of the machining cycle.

The vibration sensor 24 is a sensor that is installed independently and separately from the machine tool 20, detects the physical quantity of vibration (or sound, for example) generated by the tool 23 such as a drill, an end mill, a face mill, a long drill, a cutting tool, or a grind stone, and outputs information about the detected physical quantity to the A/D converter 30 as the detection information (vibration data). The vibration sensor 24 includes, for example, an acceleration sensor, an AE (Acoustic Emission) sensor, or the like.

Note that the vibration sensor 24 is described as the sensor that detects the physical quantity generated by the machine tool 20; however, the target of the analysis process in the diagnosis device 10 is not limited to the vibration data output from the vibration sensor 24. For example, the sensor may be an external sensor such as a torque sensor that detects the running torque of the tool or a load cell that detects the load applied to the machining target or the like, and the analysis process may be performed on the detection information output from these sensors.

The tool 23 is a machining tool such as a drill, an end mill, a face mill, a long drill, a cutting tool, or a grind stone for performing a machining process such as cutting, grinding, or polishing on the machining target.

The NC control device 25 is a device that controls the entire operation of the machining cycle in the machine tool 20 by executing an NC computer program. The NC control device 25 outputs the context information to be described below and the machining feed signal expressing that a machining process is currently performed.

The A/D converter 30 is a device that converts the analog detection information (vibration data) input from the vibration sensor 24 into the digital signal (vibration data). The A/D converter 30 also converts the machining feed signal, which expresses that the machining process is currently performed, output from the NC control device 25 into the digital signal. That is to say, the analog detection information output from the vibration sensor 24 and the machining feed signal output from the NC control device 25 are input to different channels in the A/D converter 30. The A/D converter 30 outputs the converted digital signal to the diagnosis device 10. Note that the A/D converter 30 and the diagnosis device 10 are separate devices; however, the A/D converter 30 may be an A/D conversion board that is incorporated as an extension board in the diagnosis device 10. The machining feed signal output from the NC control device 25 may be transmitted directly to the diagnosis device 10 as an on/off signal instead of being transmitted to the A/D converter 30.

Note that a plurality of vibration sensors 24 may be provided. For example, the vibration sensor 24 may be installed for each of tools 23a to 23g as illustrated in FIG. 2, which will be described below.

Structure of Holder that Holds Tool of Machine Tool

Figure 2:
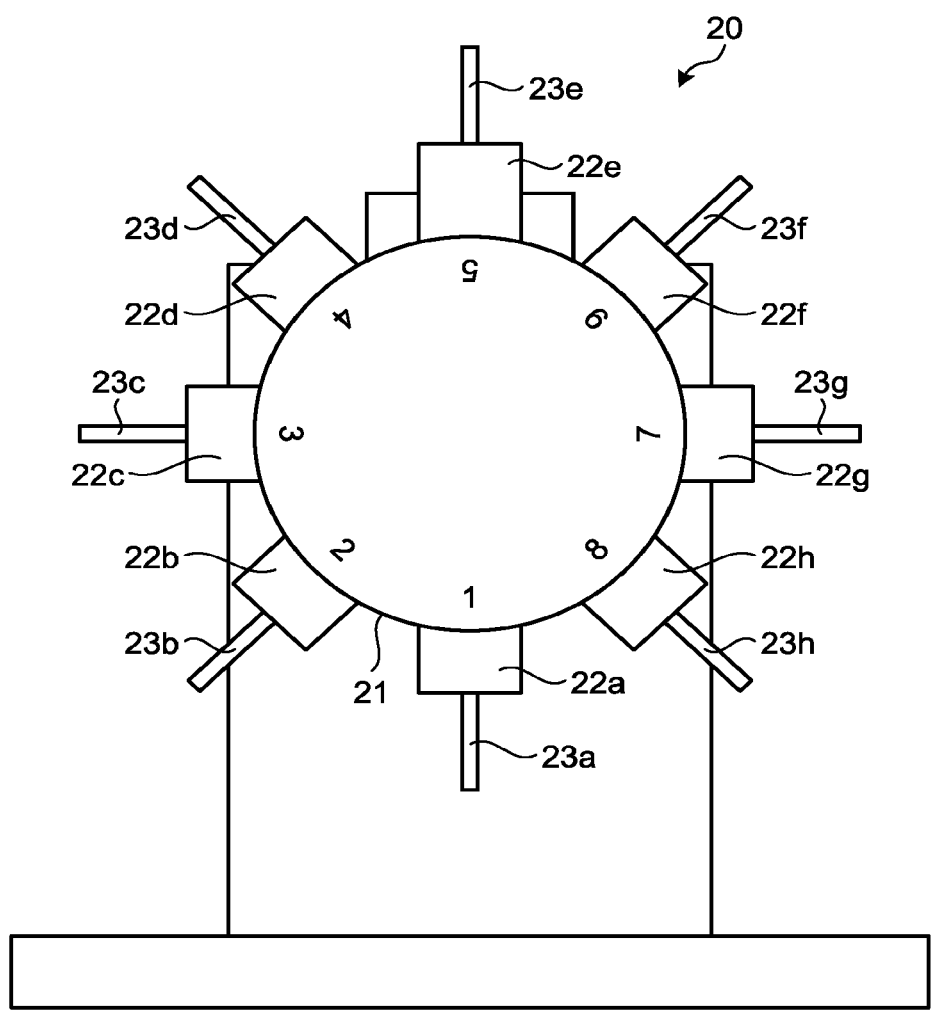
FIG. 2 is a diagram illustrating one example of a structure of each holder of a machine tool according to one embodiment.

FIG. 2 is a diagram illustrating one example of a structure of each holder of the machine tool according to one embodiment. With reference to FIG. 2, the structure of the holder 22 that holds the tool 23 of the machine tool 20 according to one embodiment is described.

As illustrated in FIG. 2, the machine tool 20 includes a rotary part 21, holders 22a to 22g, and the tools 23a to 23g. Note that when any one of the holders 22a to 22g is referred to or these holders 22a to 22g are collectively referred to, the holders 22a to 22g are simply called "holder 22". Note that when any one of the tools 23a to 23g is referred to or these tools 23a to 23g are collectively referred to, the tools 23a to 23g are simply called "tool 23".

The rotary part 21 is a circular member that is rotated by a motor using a center as an axis, and the holders 22a to 22g are disposed along an outer periphery of the circular shape at equal intervals (at 45° intervals in the example in FIG. 2). In accordance with an operation command from the NC control device 25 (see FIG. 1), the rotary part 21 performs the positioning by the rotating operation to make the tools 23a to 23g for machining the machining target move to the machining position. In the example illustrated in FIG. 2, the tool 23a held by the holder 22a is positioned at the machining position.

The holders 22a to 22g are the members for holding the tools 23a to 23g, respectively. It is only necessary that the holders 22a to 22g can hold the tools 23a to 23g detachably. Since the tools 23a to 23g are detachably attached, the tools can be exchanged in accordance with the material and shape of the machining target, the machining content, and the like.

The tools 23a to 23g are machining tools that are different from each other; for example, the tools 23a to 23g are a drill, an end mill, a face mill, a long drill, a cutting tool, a grind stone, and the like for performing the machining on the machining target, such as cutting, grinding, or polishing as described above. In the machining cycle for the machining target, each machining process is performed using one or more tools 23. That is to say, in the case where the machining process by one tool 23 is completed and the next machining process by another tool 23 starts in the machining cycle, the NC control device 25 rotates the rotary part 21 to position the tool 23 to be used in the next machining process at the machining position. In this case, in each machining process, the machining process is performed with the different tool 23 at the different parameters, for example, the different number of rotations, different feeding speed, and the different feeding quantity.

Figure 3:
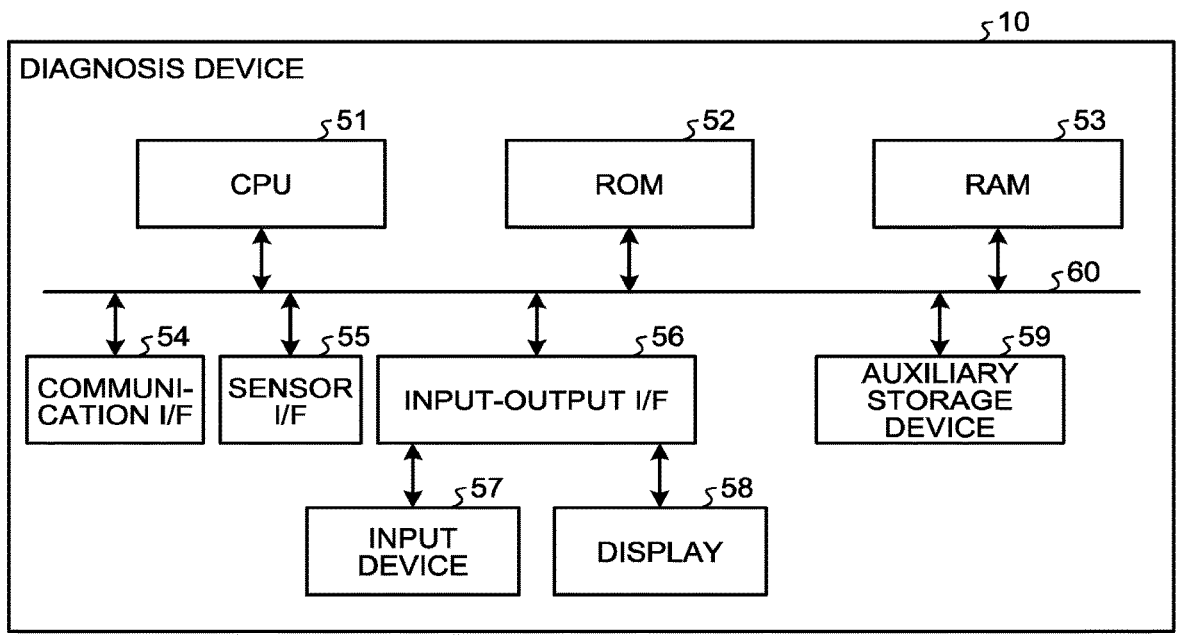
FIG. 3 is a diagram illustrating one example of a hardware structure of a diagnosis device according to one embodiment.

Hardware structure of diagnosis device FIG. 3 is a diagram illustrating one example of a hardware structure of the diagnosis device according to one embodiment. With reference to FIG. 3, the hardware structure of the diagnosis device 10 according to the present embodiment is described.

As illustrated in FIG. 3, the diagnosis device 10 includes a CPU (Central Processing Unit) 51, a ROM (Read Only Memory) 52, a RAM (Random Access Memory) 53, a communication I/F 54, a sensor I/F 55, an input-output I/F 56, and an auxiliary storage device 59. These units are connected to each other with a bus 60 so that communication therebetween is possible.

The CPU 51 is a calculation device that controls the entire diagnosis device 10. The CPU 51 executes the computer program stored in the ROM 52 or the like using the RAM 53 as a work area (working area) so as to control the entire operation of the diagnosis device 10 and implement the diagnosis function.

The communication I/F 54 is an interface to communicate with an external device, for example the machine tool 20. The communication I/F 54 is, for example, an interface based on Ethernet (registered trademark) or TCP (Transmission Control Protocol)/IP (Internet Protocol).

The sensor I/F 55 is an interface that receives the detection information (vibration data) from the vibration sensor 24 installed for the machine tool 20 and the machining feed signal. In fact, the sensor I/F 55 receives the digital signal resulting from the A/D conversion of the detection information and the machining feed signal by the A/D converter 30.

The input-output I/F 56 is an interface to connect various devices (for example, input device 57 and display 58) and the bus 60.

The input device 57 is a device for inputting letters, numerals, and the like, selecting various instructions, moving a cursor, and the like, for example a mouse or a keyboard.

The display 58 is a display device such as an LCD (Liquid Crystal Display) or an organic EL (Electro-Luminescence) display displaying various kinds of information including a cursor, menu, window, letters, and images.

The auxiliary storage device 59 is a nonvolatile storage device that stores various kinds of data including the setting information of the diagnosis device 10, the detection information received from the machine tool 20 (vibration data), the OS (Operation System), and the application computer program, and examples thereof include an HDD (Hard Disk Drive), an SSD (Solid State Drive), and an EEPROM (Electrically Erasable Programmable Read-Only Memory). The auxiliary storage device 59 is included in the diagnosis device 10; however, the auxiliary storage device 59 is not limited to this structure and the auxiliary storage device 59 may be provided outside the diagnosis device 10 or may be included in a server device that can communication data with the diagnosis device 10, in the cloud 40, or the like.

Note that the hardware structure of the diagnosis device 10 illustrated in FIG. 3 is merely one example, and does not necessarily include all the components illustrated in FIG. 3 or may include other component.

Figure 4:
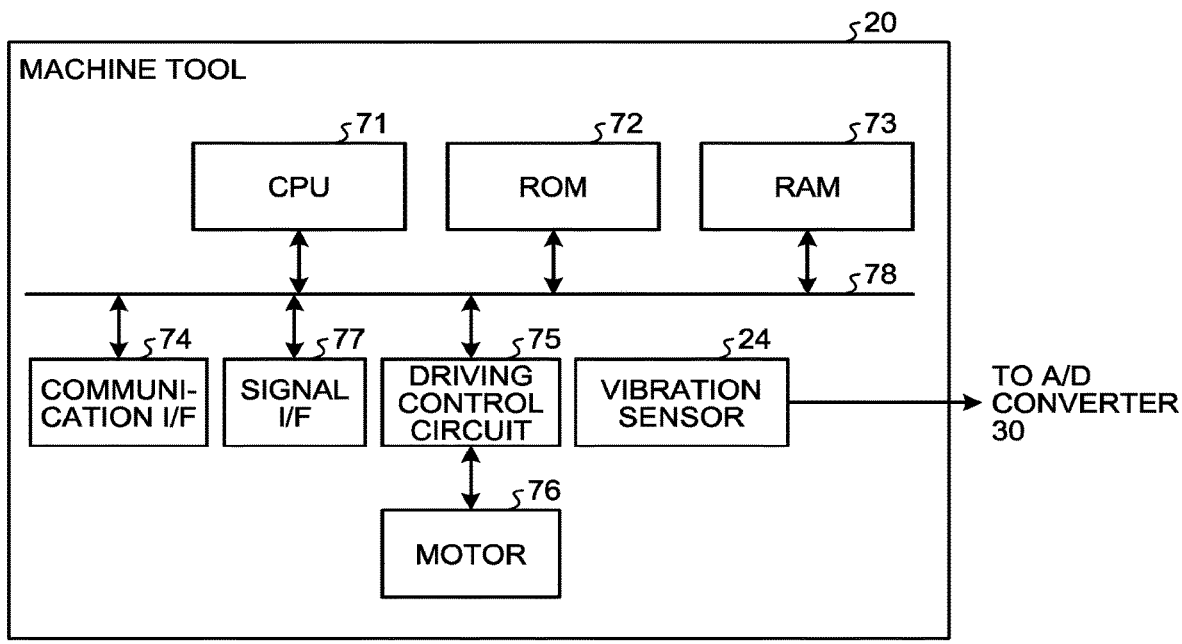
FIG. 4 is a diagram illustrating one example of a hardware structure of the machine tool according to one embodiment.

Hardware structure of machine tool 20 FIG. 4 is a diagram illustrating one example of a hardware structure of the machine tool according to one embodiment. With reference to FIG. 4, the hardware structure of the machine tool 20 according to the present embodiment is described.

As illustrated in FIG. 4, the machine tool 20 includes a CPU 71, a ROM 72, a RAM 73, a communication I/F 74, a driving control circuit 75, and a signal I/F 77, and these units are connected with each other through a bus 78 so that communication therebetween is possible. The vibration sensor 24 is installed for the machine tool 20 at the position where the vibration sensor 24 can detect the vibration generated in the machining cycle by the tool 23 as illustrated in FIG. 1 described above. However, the vibration sensor 24 does not exchange data with the machine tool 20 directly and outputs the detection information (vibration data) to the A/D converter 30 as described above.

The CPU 71 is a calculation device that controls the entire machine tool 20. The CPU 71 executes the computer program (NC computer program) stored in the ROM 72 or the like using the RAM 73 as the work area (working area), so as to control the entire operation of the machine tool 20 and implement the machining functions.

The communication I/F 74 is an interface that communicates with the external device, for example the diagnosis device 10. The driving control circuit 75 is a circuit that controls the driving of a motor 76. The motor 76 drives the tool 23 such as a drill, an end mill, a face mill, a long drill, a cutting tool, or a grind stone. Note that the motor 76 may be provided in accordance with each of the tools 23a to 23g illustrated in FIG. 2, or the internal mechanism of the machine tool 20 may switch such that the rotating power of one motor 76 is transmitted to the tool 23 that is positioned at the machining position by the rotation of the rotary part 21.

The signal I/F 77 is an interface that transmits the machining feed signal to the diagnosis device 10 in the case where the machining process is performed in the machine tool 20. The signal I/F 77 has a coaxial cable connected thereto through, for example, a connector of BNC (Bayonet Neill-Concelman connector) based on Ethernet standards such as 10BASE-2.

Note that the hardware structure of the diagnosis device 10 illustrated in FIG. 4 is one example, and may include other component than those illustrated in FIG. 4. For example, the machine tool 20 may include a display that can display content similar to that displayed in the display 58 included in the diagnosis device 10.

The NC control device 25 illustrated in FIG. 1 is a device that includes the CPU 71, the ROM 72, the RAM 73, the communication I/F 74, and the driving control circuit 75, for example. However, the structure is not limited to this example, and the machine tool 20 may include a CPU in addition to the CPU 71 included in the NC control device 25. In this case, the CPU provided in addition to the CPU 71 may perform the operation other than the machining operation, for example a lighting operation for a lamp or an LED (Light Emitting Diode) or the like installed for the machine tool 20, or control of a rotary motor that positions the rotary part 21 that is not related to the machining operation directly, for example.

Structure and Operation of Function Block of Diagnosis System

Figure 5:
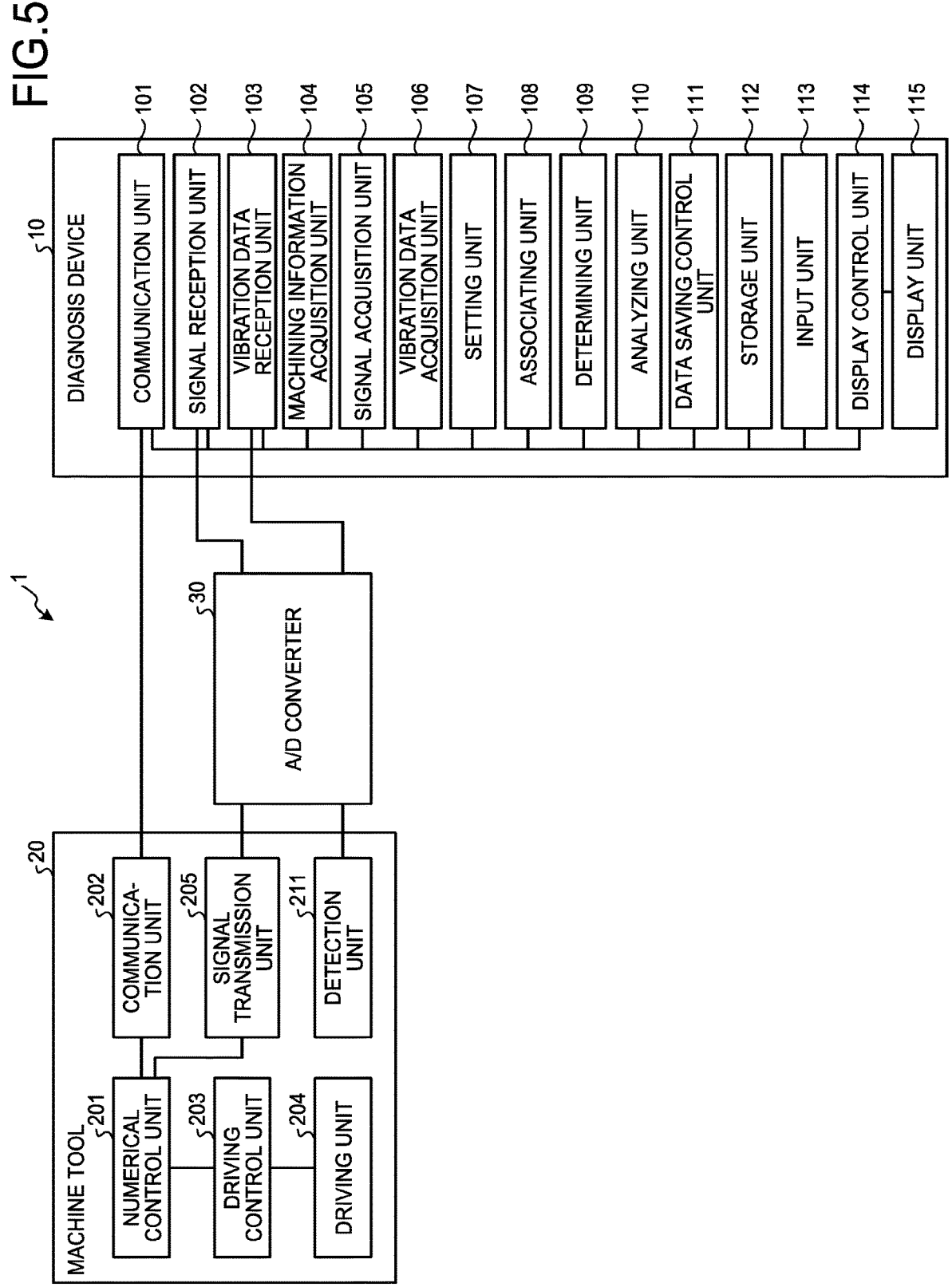
FIG. 5 is a diagram illustrating one example of a structure of function blocks of the diagnosis system according to one embodiment.
Figure 6:
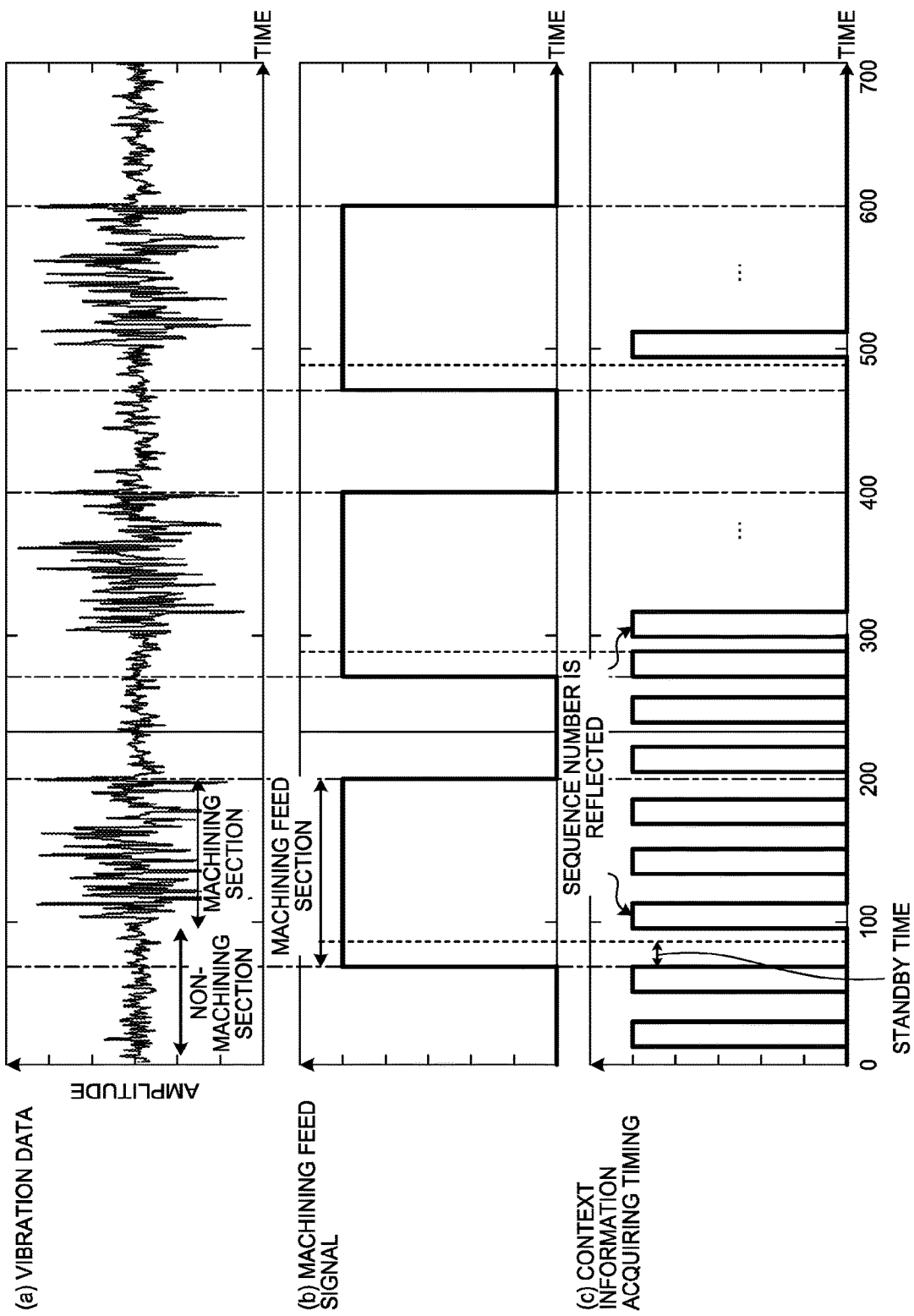
FIG. 6 is a diagram for describing an operation for associating vibration data and sequence numbers.
Figure 7:
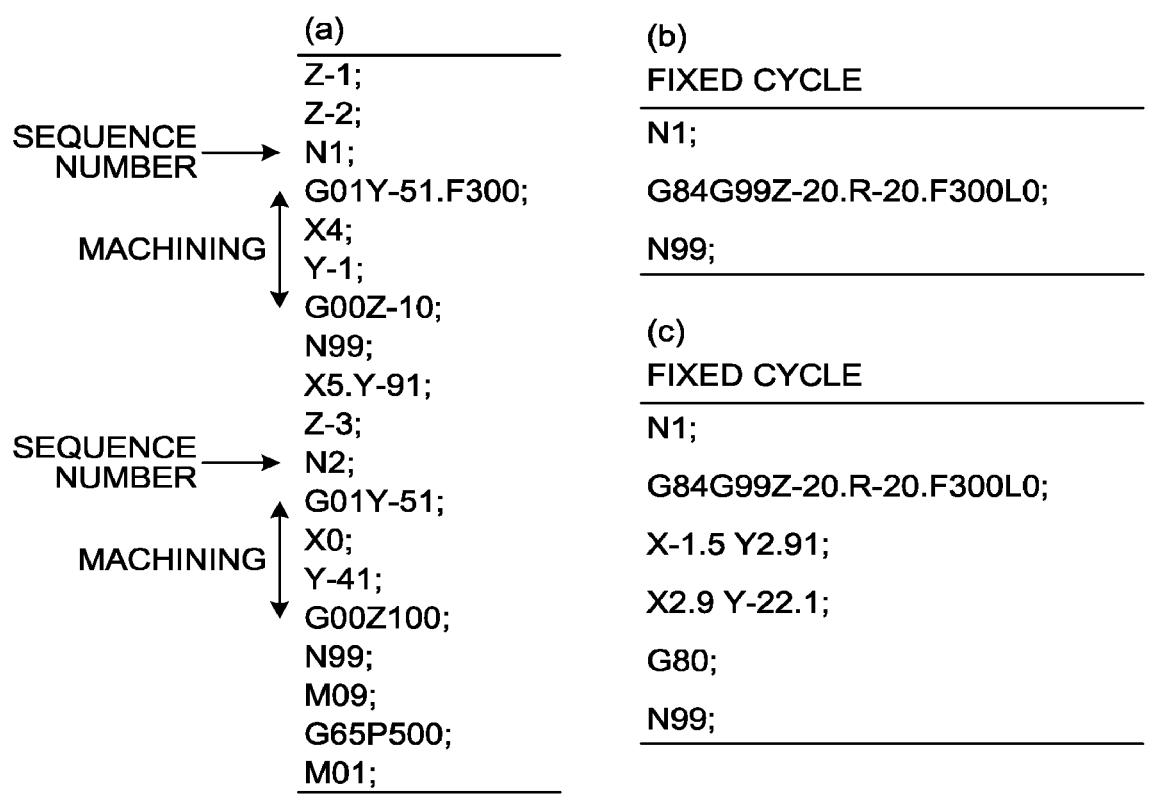
FIG. 7 is a diagram illustrating one example of a state where the sequence numbers are incorporated in the machining program.
Figure 8:
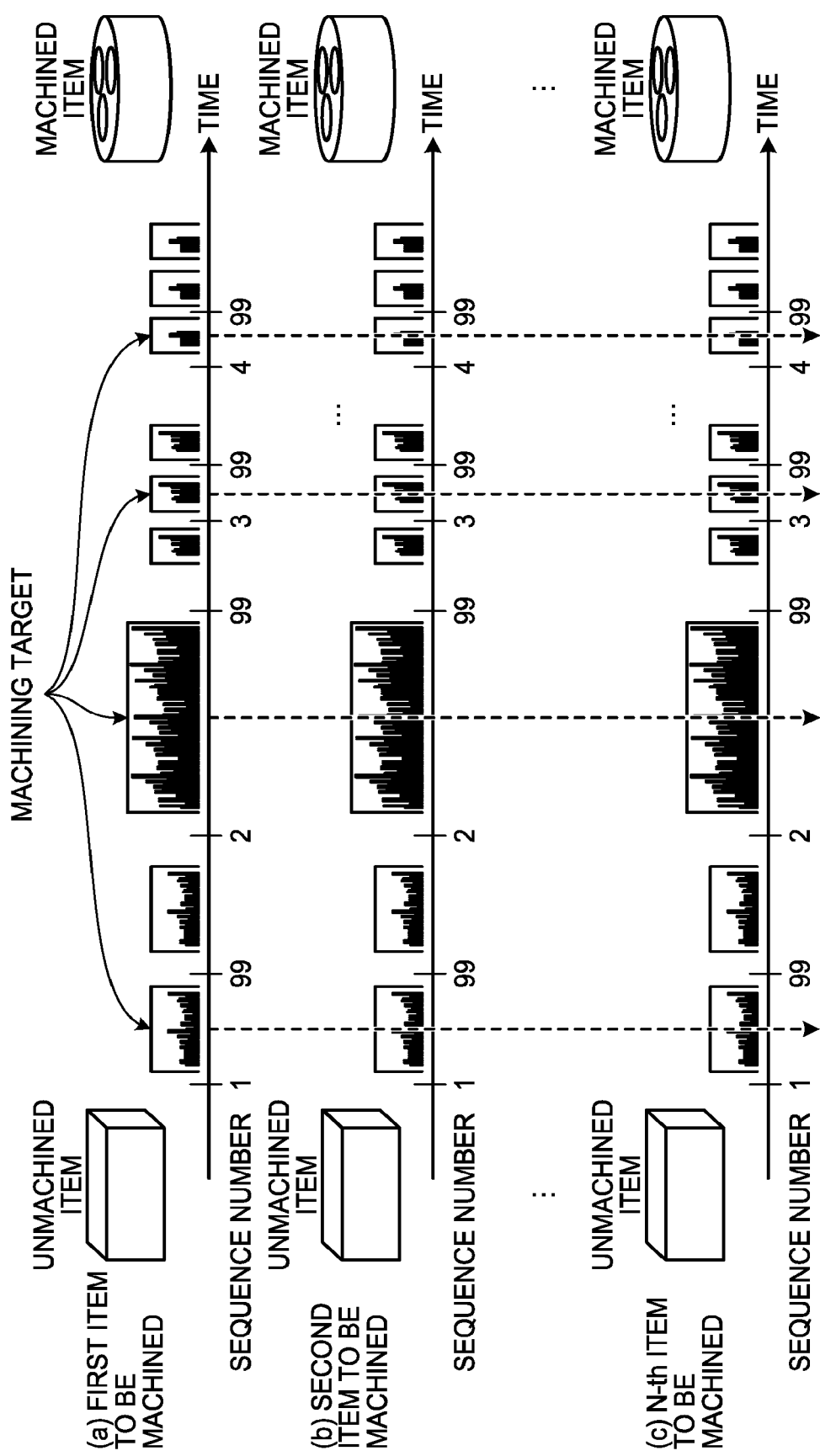
FIG. 8 is a diagram for describing a state in which each machining process in a series of machining cycles is identified by the sequence number.
Figure 9:
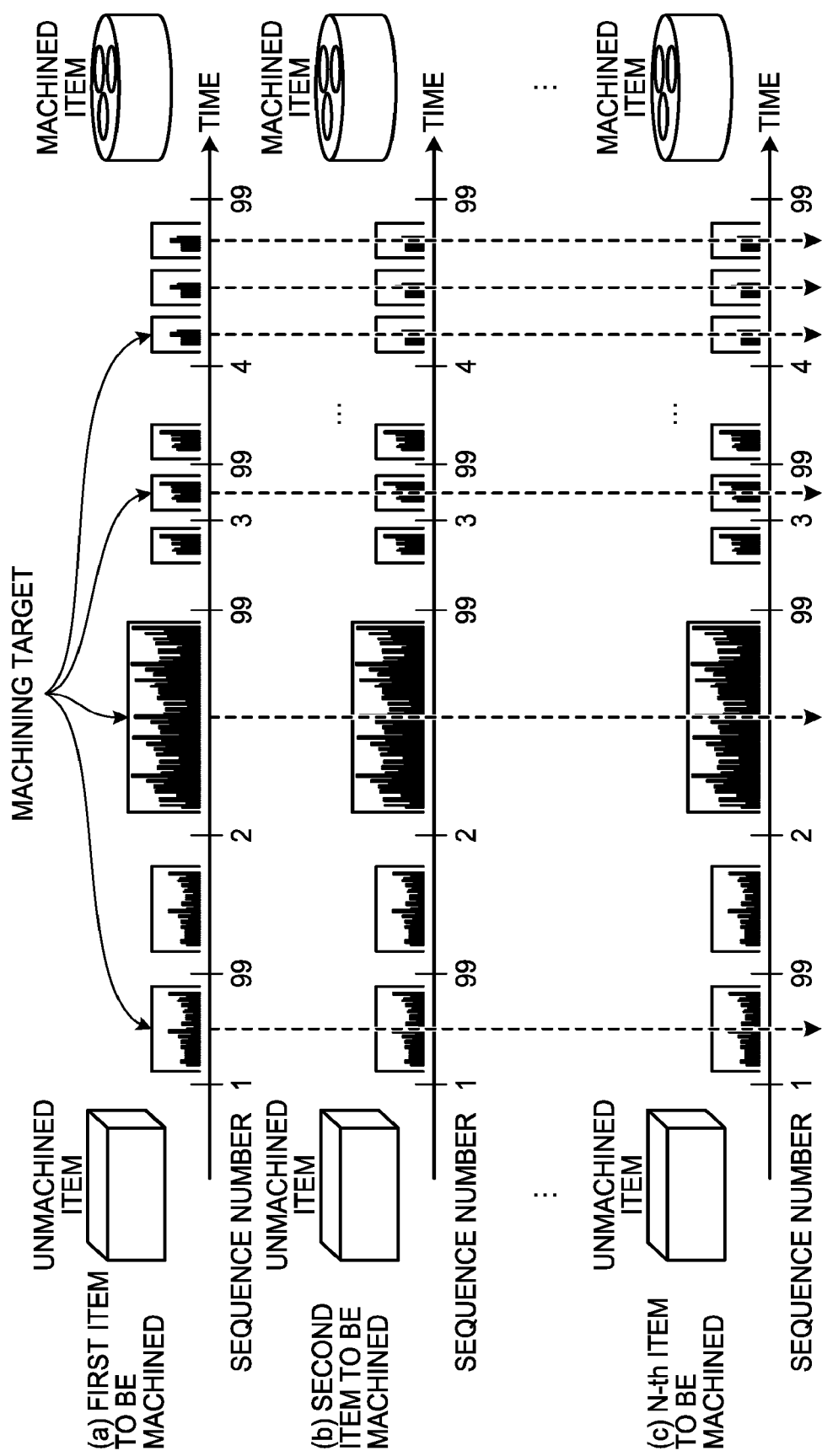
FIG. 9 is a diagram illustrating one example of a state where a machining process identified by one sequence number in a series of machining cycles includes a plurality of machinings.
Figure 10:
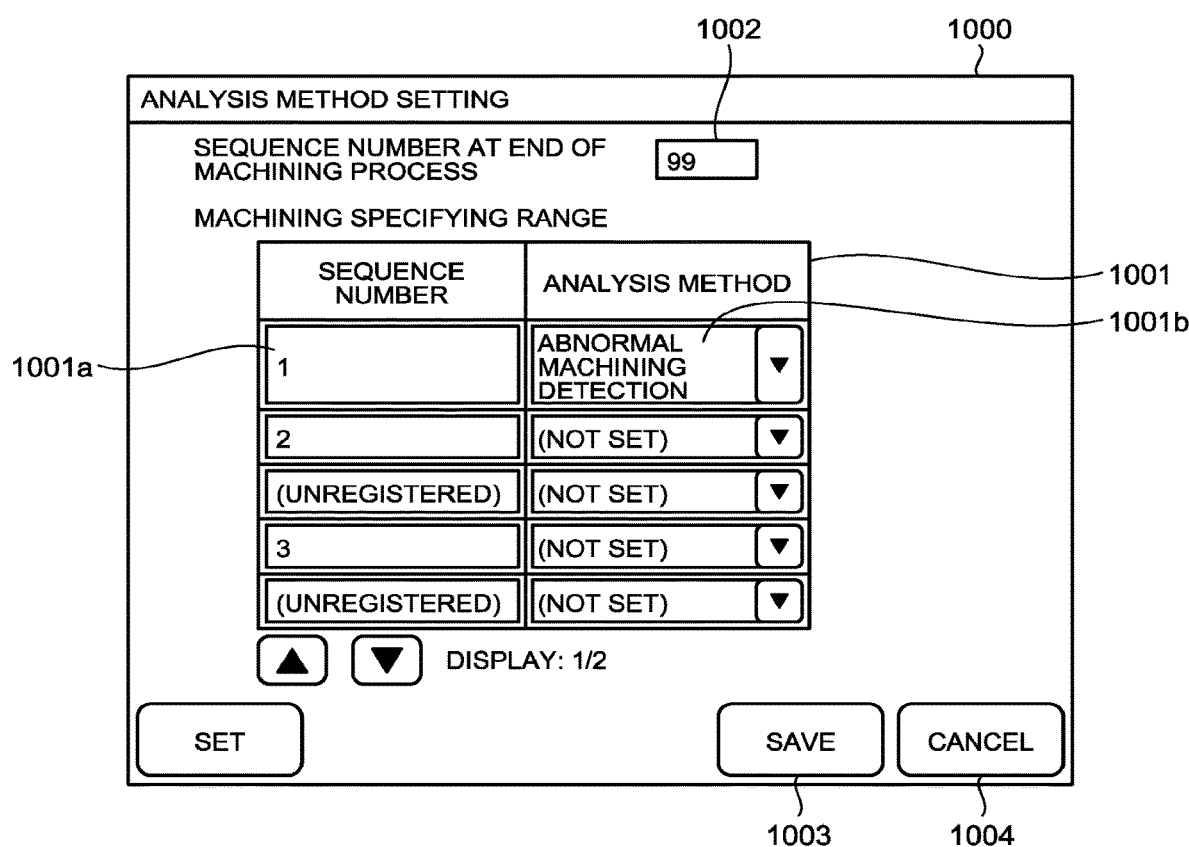
FIG. 10 is a diagram illustrating one example of an analysis method setting screen for associating the sequence number with an analysis method.

FIG. 5 is a diagram illustrating one example of a structure of function blocks of the diagnosis system according to one embodiment. FIG. 6 is a diagram for describing an operation for associating the vibration data and the sequence numbers. FIG. 7 is a diagram illustrating one example of a state where the sequence numbers are incorporated in the machining program. FIG. 8 is a diagram for describing a state in which each machining process in a series of machining cycles is identified by the sequence number. FIG. 9 is a diagram illustrating one example of a state where a plurality of machining processes are associated with one sequence number in a series of machining cycles. FIG. 10 is a diagram illustrating one example of an analysis method setting screen for associating the sequence number with an analysis method. With reference to FIG. 5, the structure of the function blocks of the diagnosis system 1 according to one embodiment is described.

As illustrated in FIG. 5, the diagnosis device 10 includes a communication unit 101, a signal reception unit 102, a vibration data reception unit 103, a machining information acquisition unit 104 (first acquisition unit), a signal acquisition unit 105 (third acquisition unit), a vibration data acquisition unit 106 (second acquisition unit), a setting unit 107, an associating unit 108, a determining unit 109, an analyzing unit 110, a data saving control unit 111 (saving unit), a storage unit 112, an input unit 113, a display control unit 114, and a display unit 115.

The communication unit 101 is a function unit that performs data communication with the machine tool 20. The communication unit 101 receives the context information from the machine tool 20, for example.

Here, the context information is the information including the identification information, the operation information, and the like about the machine tool 20. Examples of the content information include the identification information (model, etc.) of the machine tool 20, the identification information of a driving unit 204 (described below), the machining condition including the operation state, the number of rotations, and the machining speed at that time, the diameter and the material of the tool 23 driven by the driving unit 204, the sequence number, the cycle number, and the tool number. Here, the sequence number (monitoring specifying number) corresponds to the number expressing the status of each machining process defined in the NC computer program that defines each machining process in the machining cycle, and in the present embodiment, corresponds to the number that is inserted in a start part and an end part of each machining process. That is to say, by specifying the sequence number included in the context information received by the communication unit 101, the machining process that is currently performed can be identified. Moreover, the machining cycle is performed repeatedly for each machining target, and the cycle number is the number that represents what number of times (what cycle) the current machining cycle corresponds. The tool number expresses the number that identifies the tools 23a to 23g held by the holders 22a to 22g in the rotary part 21, respectively. For example, the numbers "1" to "8" on the surface of the rotary part 21 as illustrated in FIG. 2 may be treated as the tool number.

The communication unit 101 is implemented by the communication I/F 54 illustrated in FIG. 3.

The signal reception unit 102 is a function unit that receives the machining feed signal expressing that the machining process is currently performed in the machine tool 20 through the A/D converter 30. The signal reception unit 102 is implemented by the sensor I/F 55 illustrated in FIG. 3.

The vibration data reception unit 103 is a function unit that receives, through the A/D converter 30, the detection information (vibration data) resulting from the detection of the vibration generated in the machining process from the vibration sensor 24 installed for the machine tool 20. The vibration data reception unit 103 is implemented by the sensor I/F 55 illustrated in FIG. 3. That is to say, the vibration data reception unit 103 is implemented by the same hardware as the signal reception unit 102 (sensor I/F 55). Note that instead of the structure in which the signal reception unit 102 and the vibration data reception unit 103 are formed of the same hardware, these units may be formed by separate interfaces.

The machining information acquisition unit 104 is a function unit that acquires the context information (machining information) received by the communication unit 101 from the machine tool 20. The machining information acquisition unit 104 is implemented when the CPU 51 illustrated in FIG. 3 executes the computer program, for example.

The signal acquisition unit 105 is a function unit that acquires the machining feed signal received by the signal reception unit 102 from the machine tool 20 through the A/D converter 30. The signal acquisition unit 105 is implemented when the CPU 51 illustrated in FIG. 3 executes the computer program, for example.

The vibration data acquisition unit 106 is a function unit that acquires the detection information (vibration data) received by the vibration data reception unit 103 from the vibration sensor 24 through the A/D converter 30. The vibration data acquisition unit 106 is implemented when the CPU 51 illustrated in FIG. 3 executes the computer program, for example.

The setting unit 107 is a function unit that performs the setting about the association between the analysis method and the sequence number in accordance with the user's operation for the input unit 113. For example, the setting unit 107 sets the association between the analysis method and the sequence number in accordance with the user's operation, in an analysis method setting screen 1000 illustrated in FIG. 10 that is displayed on the display unit 115.

The analysis method setting screen 1000 illustrated in FIG. 10 includes an analysis method setting unit 1001, an end sequence number input unit 1002, a save button 1003, and a cancel button 1004.

The analysis method setting unit 1001 includes a sequence number input unit 1001a for inputting the sequence number, and an analysis method selecting unit

1001b for selecting and inputting the analysis method. The sequence number input by this analysis method setting unit 1001 and the selected analysis method are associated with each other by the setting unit 107. The sequence number set by the sequence number input unit 1001a (hereinafter also referred to as a start sequence number) serves as the number that identifies the machining process, and is included in the context number to be received by the communication unit 101 in the case where the corresponding machining process is performed in the machine tool 20. Examples of the analysis method include visualization, machining process period estimation, abnormal machining detection, breakage detection, and breakage symptom detection. For example, in the example illustrated in FIG. 10, the sequence number "1" and the analysis method "abnormal machining detection" are associated with each other. In the analysis method setting unit 1001, a plurality of analysis methods can be set for one sequence number.

The end sequence number input unit 1002 is an input unit for inputting the sequence number that expresses the end of each machining process. Here, each machining process is identified by the sequence number input by the aforementioned sequence number input unit 1001a; therefore, the end sequence number input unit 1002 only needs to be able to set the common number in order to indicate the timing when each machining process has ended. For example, in the example illustrated in FIG. 10, the numeral "99" is input as the sequence number that indicates the timing when each machining process ends.

The save button 1003 is a button for fixing various kinds of information input to the analysis method setting unit 1001 and the end sequence number input unit 1002 and saving the information in the storage unit 112. When the save button 1003 has been pressed, the setting unit 107 saves, in the storage unit 112, the association information between the start sequence number and the analysis method, and the sequence number that indicates the end of the machining process (hereinafter also referred to as end sequence number).

The cancel button 1004 is a button for canceling, without fixing, various kinds of information input to the analysis method setting unit 1001 and the end sequence number input unit 1002.

The setting unit 107 is implemented when the CPU 51 illustrated in FIG. 3 executes the computer program, for example.

The associating unit 108 is a function unit that associates the sequence number included in the context information acquired by the machining information acquisition unit 104, and the detection information (vibration data) acquired by the vibration data acquisition unit 106.

When one machining process in the machining cycle has been started in the machine tool 20, the acquisition operation for acquiring the detection information (vibration data) from the vibration sensor 24 by the vibration data acquisition unit 106 is started. Here, one example of the waveform of the vibration data is illustrated at (a) in FIG. 6. As illustrated at (a) in FIG. 6, the vibration data includes the waveform in a machining section expressing the operation in which the process is performed and the machining target is being machined with the tool 23, and the waveform in a non-machining section where the operation is not performed.

When the machining process has been started, the acquisition operation for acquiring the machining feed signal from the machine tool 20 by the signal acquisition unit 105 is started. Here, one example of the waveform of the machining feed signal is illustrated at (b) in FIG. 6. As illustrated at (b) in FIG. 6, the signal reception unit 102 receives the machining feed signal (the signal acquisition unit 105 acquires the machining signal) when the waveform is in a high level state (hereinafter also referred to as when the machining feed signal is in an on state), and the signal reception unit 102 does not receive the machining feed signal (the signal acquisition unit 105 does not acquire the machining signal) when the waveform is in a low level state (hereinafter also referred to as when the machining feed signal is in an off state).

In this case, from among the detection information (vibration data) acquired by the vibration data acquisition unit 106, the associating unit 108 extracts the detection information corresponding to the period (machining feed section) for which the signal acquisition unit 105 acquires the machining feed signal (the period for which the machining feed signal is in the on state). Then, the associating unit 108 associates the extracted detection information (vibration data) with the sequence number included in the context information acquired by the machining information acquisition unit 104 after a predetermined standby time from when the machining feed time has become the on state. Here, FIG. 6 illustrates, at (c), a timing chart expressing the timing when the context information is acquired. As illustrated at (c) in FIG. 6, the machining information acquisition unit 104 acquires the context information received by the communication unit 101 at predetermined intervals. The standby time described above is the time depending on the machine tool 20. In the case where the machine tool 20 performs the machining process in the machining program, it takes a certain time until the sequence number is reflected in the context information to be output to the diagnosis device 10 as the internal parameter; therefore, the standby time is at least the aforementioned certain time or more.

The associating unit 108 is implemented when the CPU 51 illustrated in FIG. 3 executes the computer program, for example.

The determining unit 109 determines whether the detection information (vibration data) associated with a particular sequence number by the associating unit 108 is the target to be analyzed by the analysis method set by the setting unit 107. Specifically, in the case where the sequence number associated with the detection information (vibration data) extracted by the associating unit 108 coincides with the sequence number included in the association information set by the setting unit 107, the determining unit 109 determines that the detection information (vibration data) is the target to be analyzed by the analysis method associated with the sequence number that has coincided in the association information. The determining unit 109 is implemented when the CPU 51 illustrated in FIG. 3 executes the computer program, for example.

The analyzing unit 110 is a function unit that analyzes the detection information (vibration data) associated with the particular sequence number by the associating unit 108 in accordance with the analysis method that has been determined to be the target by the determining unit 109. The analyzing unit 110 is implemented when the CPU 51 illustrated in FIG. 3 executes the computer program, for example.

The data saving control unit 111 is a function unit that saves, in the storage unit 112, the sequence number and the detection information (vibration data) associated with each other by the associating unit 108 and the information expressing the result of the analysis process by the analyzing unit 110. The data saving control unit 111 is implemented when the CPU 51 illustrated in FIG. 3 executes the computer program, for example.

The storage unit 112 is a function unit that stores the association information between the analysis method and the sequence number set by the setting unit 107, the sequence number and the detection information (vibration data) associated with each other by the associating unit 108, the information expressing the result of the analysis process by the analyzing unit 110, and the like. The storage unit 112 is implemented by at least one of the RAM 53 and the auxiliary storage device 59 illustrated in FIG. 3.

The input unit 113 is a function unit that receives the operation input from the user. The input unit 113 is implemented by the input device 57 illustrated in FIG. 3.

The display control unit 114 is a function unit that controls the display operation of the display unit 115. The display control unit 114 causes the display unit 115 to display the analysis method setting screen 1000, which is illustrated in FIG. 10, in accordance with the user's operation for the input unit 113. The display control unit 114 is implemented when the CPU 51 illustrated in FIG. 3 executes the computer program, for example. The display unit 115 is implemented by the display 58 illustrated in FIG. 3.

Note that the machining information acquisition unit 104, the signal acquisition unit 105, the vibration data acquisition unit 106, the setting unit 107, the associating unit 108, the determining unit 109, the analyzing unit 110, the data saving control unit 111, and the display control unit 114 in the diagnosis device 10 illustrated in FIG. 5 are not limited to those that are implemented when the CPU 51 illustrated in FIG. 3 executes the computer program. These units may alternatively be implemented by hardware such as an IC (Integrated Circuit).

The function units of the diagnosis device 10 are illustrated conceptually in FIG. 5, and are not limited to this structure. For example, a plurality of function units that are illustrated as the independent function units in the diagnosis device 10 in FIG. 5 may be formed as one function unit. On the other hand, the function of one function unit in the diagnosis device 10 illustrated in FIG. 5 may be divided into a plurality of functions to form a plurality of function units.

As illustrated in FIG. 5, the machine tool 20 includes a numerical control unit 201, a communication unit 202 (transmission unit), a driving control unit 203, a driving unit 204, a signal transmission unit 205, and a detection unit 211.

The numerical control unit 201 is a function unit that performs the machining by the driving unit 204 through numerical control (NC). For example, the numerical control unit 201 generates and outputs the numerical control data for controlling the operation of the driving unit 204. In addition, the numerical control unit 201 transmits the context information to the diagnosis device 10 through the communication unit 202, and transmits the machining feed signal (operation signal) to the diagnosis device 10 through the signal transmission unit 205 while the machining process of the machining cycle defined in the NC computer program is performed. The numerical control unit 201 changes the kind of the driving unit 204 to drive or the driving state (number of rotations, rotating speed, etc.) of the driving unit 204 in accordance with the machining process when the machining target is machined. Every time the kind of the operation is changed, the numerical control unit 201 sequentially transmits the context information corresponding to the kind of the operation after the change to the diagnosis device 10 through the communication unit 202. For example, the numerical control unit 201 is implemented when the CPU 71 illustrated in FIG. 4 executes the computer program (NC computer program), for example.

Here, one example of the NC computer program (one example of the machining program) to be executed by the CPU 71 is illustrated in FIG. 7. The NC computer program illustrated at (a) in FIG. 7 includes two machining processes defined by a series of operation orders such as a G code and an M code. In the NC computer program, X, Y, and Z correspond to the commands that set the respective coordinate positions. Here, the G code is one of order codes used in the numerical control, and is the command code described when the positioning, linear interpolation, circular interpolation, or plane designation for the control target (driving unit 204) is performed. In addition, the M code is the command code that executes the auxiliary function such as rotation or stop of the main axis. Each machining process starts with the machining feed command such as "G01", "G02", or "G03" and ends with the code "G00" for positioning the tool 23 at the original position. In a start part of the code that defines the two machining processes included in the NC computer program illustrated at (a) in FIG. 7, the codes "N1" and "N2" (N codes) that define the sequence numbers for identifying the machining processes are inserted. Moreover, in an end part of the code that defines the two machining processes (next to the code "G00"), the common code "N99" that defines the sequence number expressing the end of the machining process is inserted. "N1" represents the sequence number "1", "N2" represents the sequence number "2", and "N99" represents the sequence number "99". When the code ("N2;" for example) of the sequence number that is defined in the NC computer program has been executed, the numerical control unit 201 puts the sequence number represented by the code in the context information and transmits the context information to the diagnosis device 10 through the communication unit 202.

Moreover, in the case where the code representing the same operation command is executed in each machining process included in a plurality of kinds of machining cycles, the code may be called a fixed cycle (subprogram) illustrated at (b) and (c) in FIG. 7. The sequence number that identifies the machining process is also inserted in the case of the fixed cycle as illustrated at (b) and (c) in FIG. 7, for example.

In the example of the NC computer program illustrated in FIG. 7, the N code is used to specify the sequence number; however, the present invention is not limited to this example. In another example, if the machine tool 20 can specify the sequence number with any other code than the N code, the machining process may be identified using that code.

The communication unit 202 is a function unit that performs data communication with the diagnosis device 10. For example, the communication unit 202 transmits the context information corresponding to the operation at that time point to the diagnosis device 100 in accordance with the control of the numerical control unit 201. The communication unit 202 is implemented by the computer program that operates in the communication I/F 74 and the CPU 71 illustrated in FIG. 4, for example.

The driving control unit 203 is a function unit that drives and controls the driving unit 204 on the basis of the numerical control data obtained by the numerical control unit 201. The driving control unit 203 is implemented by the driving control circuit 75 illustrated in FIG. 4, for example.

The driving unit 204 is a function unit to be driven and controlled by the driving control unit 203. The driving unit 204 drives the tool 23 by the control of the driving control unit 203. The driving unit 204 is a motor or the like, and may be any unit that is used in the machining and can be an target of the numerical control. Note that the number of driving units 204 may be two or more. The driving unit 204 is an actuator that is driven and controlled by the driving control unit 203, and is implemented by the motor 76 or the like as illustrated in FIG. 2, for example.

The signal transmission unit 205 is a function unit that transmits the machining feed signal to the diagnosis device 10 when the machining process in the machining cycle defined by the NC computer program is performed by the numerical control unit 201. The signal transmission unit 205 is implemented by the computer program executed in the signal I/F 77 and the CPU 71 illustrated in FIG. 4.

The detection unit 211 is a function unit that detects the physical quantity of the vibration (or sound, for example) generated from the tool 23 held in the machine tool 20, and outputs the information about the detected physical quantity to the A/D converter 30 as the detection information (vibration data). The detection unit 211 is implemented by the vibration sensor 24 illustrated in FIG. 4. The number of detection units 211 is arbitrarily determined. For example, a plurality of detection units 211 that detect the same physical quantity may be provided or the detection units 211 that detect the different physical quantities may be provided.

Note that the function units of the machine tool 20 are illustrated conceptually in FIG. 5, and are not limited to this structure. For example, a plurality of function units that are illustrated as the independent function units in the machine tool 20 in FIG. 5 may be formed as one function unit. On the other hand, the function of one function unit in the machine tool 20 illustrated in FIG. 5 may be divided into a plurality of functions to form a plurality of function units.

Here, with reference to FIG. 8, the operation in which each machining process in the machining cycle is associated with the sequence number and the analysis process is performed on the vibration data in the machining process is described. In the example illustrated in FIG. 8, one machining target (unmachined item) is machined by the machining cycle including four machining processes, and thus the machined item is obtained. Here, the setting for associating the analysis method with each of the sequence numbers "1" to "4" is performed in advance on the analysis method setting screen 1000 as described above. FIG. 8 illustrates, at (a), a state in which the machining process by the machining cycle for the first unmachined item (first item to be machined) is performed, so that the first machined item is obtained. FIG. 8 illustrates, at (b), a state in which the machining process by the machining cycle for the second unmachined item (second item to be machined) is performed, so that the second machined item is obtained. FIG. 8 illustrates, at (c), a state in which the machining process by the machining cycle for the N-th unmachined item (N-th item to be machined) is performed, so that the N-th machined item is obtained.

When the machining cycle has been started, the associating unit 108 extracts the vibration data corresponding to the period for which the signal acquisition unit 105 acquires the machining feed signal (the period where the machining feed signal is in the on state) from the vibration data acquired by the vibration data acquisition unit 106. Then, the associating unit 108 associates the extracted vibration data with the sequence number "1" included in the context information acquired by the machining information acquisition unit 104 after the predetermined standby time from when the machining feed time has become the on state. That is to say, the machining process where the vibration data is acquired is associated with the sequence number "1".

Next, in the case where the sequence number "1" associated with the vibration data extracted by the associating unit 108 coincides with the sequence number included in the association information set by the setting unit 107, the determining unit 109 determines that this vibration data is the target of the analysis process by the analysis method that is associated with the sequence number "1" that has coincided in the association information. Then, the analyzing unit 110 analyzes the vibration data associated with the sequence number "1" by the associating unit 108 in accordance with the analysis method that has been determined to be the target by the determining unit 109. Then, the data saving control unit 111 saves, in the storage unit 112, the sequence number and the vibration data associated with each other by the associating unit 108, and the information expressing the result of the analysis process by the analyzing unit 110.

In the machining processes identified by the sequence numbers "2" to "4" in the machining cycle, the associating unit 108 associates the vibration data, the determining unit 109 determines the analysis method, the analyzing unit 110 performs the analysis process, and the data saving control unit 111 saves the data in a manner similar to that described above.

Here, as illustrated in FIG. 8, for example, some kind of process that generates the vibration data between the machining process identified by the sequence number "1" and the machining process identified by the sequence number "2" does not include the sequence number (number other than "99") in the context information output from the machine tool 20 during the process; therefore, this process is not the target of the analysis process. Even if the context information output from the machine tool 20 during the process includes the sequence number (number other than "99"), when that sequence number is the number that is not included in the association information by the determining unit 109, this process is not associated with the particular analysis method and does not become the target of the analysis process.

In this manner, as illustrated in FIG. 8, for example, the machining process that is identified by the same sequence number for the first item and the second item is determined to be the identical machining process, and the change in time series, the transition of the abnormal score, and the like in the corresponding machining process can be checked.

FIG. 9 is a diagram illustrating one example of a state in which the machining process identified by one sequence number in a series of machining cycles includes a plurality of machinings. Next, with reference to FIG. 9, the case in which one machining process includes a plurality of machinings is described.

In the example illustrated in FIG. 9, the machining process identified by the sequence number "4" includes a plurality of (here, three) machinings. In this case, for example, the associating unit 108 associates the sequence number "4" with the extracted vibration data and recognizes that the machinings included in the vibration data is the machinings between which the tool 23 is switched by the rotation of the rotary part 21 and in which the different tools 23 are used. The machining feed signal becomes on for each machining, and becomes off after the machining, and each machining may be distinguished by the step number, for example. That is to say, in the example illustrated in FIG. 9, the machinings in the machining process identified by the sequence number "4" are distinguished as follows: the first machining is the first step, the second machining is the second step, and the third machining is the third step. In this case, these step numbers may be included in the context information and output from the machine tool 20 to the diagnosis device 10. The positioning of the rotation by the rotary part 21 is initialized when the next machining cycle starts.

Figure 11:
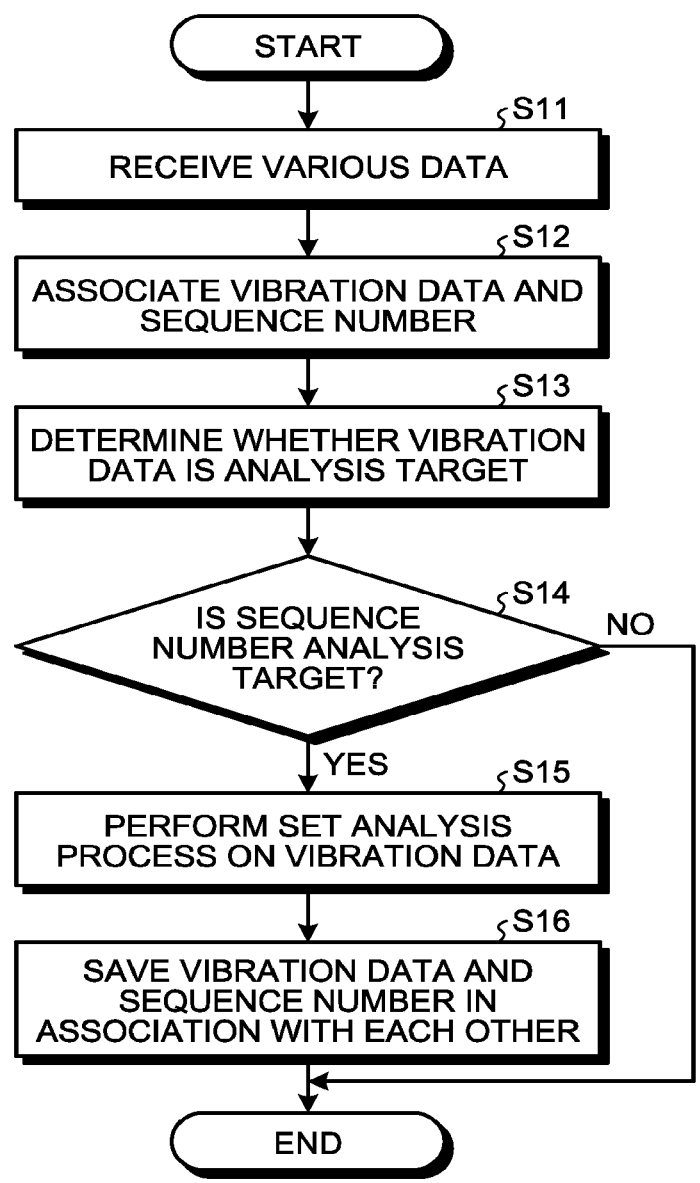
FIG. 11 is a diagram illustrating one example of a procedure of a diagnosis process in the diagnosis system according to one embodiment.

Procedure of diagnosis process in diagnosis system FIG. 11 is a diagram illustrating one example of the procedure of the diagnosis process in the diagnosis system according to one embodiment. With reference to FIG. 11, the procedure of the diagnosis process in the diagnosis system 1 according to the present embodiment is described.

Step S11

When the machining cycle for the machining target in the machine tool 20 has been started, the numerical control unit 201 transmits the context information to the diagnosis device 10 through the communication unit 202, and transmits the machining feed signal to the diagnosis device 10 through the signal transmission unit 205 while the machining process of the machining cycle defined in the NC computer program is performed. Moreover, when the detection unit 211 has detected the physical quantity of the vibration (or sound, for example) generated from the tool 23 held in the machine tool 20 while the machining cycle is performed, the information about the detected physical quantity is transmitted to the diagnosis device 10 through the A/D converter 30 as the detection information (vibration data).

On the diagnosis device 10 side, the machining information acquisition unit 104 acquires the context information (machining information) received by the communication unit 101 from the machine tool 20. In addition, the signal acquisition unit 105 acquires the machining feed signal received by the signal reception unit 102 from the machine tool 20 through the A/D converter 30. Then, the vibration data acquisition unit 106 acquires the detection information (vibration data) received by the vibration data reception unit 103 from the detection unit 211 through the A/D converter 30. Then, the process advances to step S12.

Step S12 When the signal acquisition unit 105 has started to acquire the machining feed signal, the associating unit 108 in the diagnosis device 10 extracts the detection information corresponding to the period for which the machining feed signal is acquired (the period for which the machining feed signal is in the on state) (machining feed section) from among the detection information (vibration data) acquired by the vibration data acquisition unit 106. Then, the associating unit 108 associates the sequence number included in the context information acquired by the machining information acquisition unit 104 after the predetermined standby time from when the machining feed time has become the on state, with the extracted detection information (vibration data). Then, the process advances to step S13.

Step S13

In the case where the sequence number associated with the detection information (vibration data) extracted by the associating unit 108 coincides with the sequence number included in the association information set by the setting unit 107, the determining unit 109 in the diagnosis device 10 determines that the detection information (vibration data) is the target of the analysis process by the analysis method associated with the sequence number that has coincided in the association information. Then, the process advances to step S14.

Step S14

In the case where the sequence number associated with the detection information (vibration data) extracted by the associating unit 108 is associated with the particular analysis method by the association information (Yes at step S14), the process advances to step S15. On the other hand, in the case where the sequence number is not associated with the particular analysis method by the association information (No at step S14), the diagnosis process ends.

Step S15

The analyzing unit 110 in the diagnosis device 10 analyzes the detection information (vibration data) associated with the particular sequence number by the associating unit 108 in accordance with the analysis method that has been determined to be the target by the determining unit 109. Then, the process advances to step S16.

Step S16

The data saving control unit 111 in the diagnosis device 10 saves, in the storage unit 112, the detection information (vibration data) and the sequence number that are associated with each other by the associating unit 108, and the information expressing the result of the analysis process by the analyzing unit 110. Thus, the diagnosis process for one machining process ends. In the case where the machining cycle includes a plurality of machining processes, the process at steps S11 to S16 is repeated for each machining process.

In the flowchart illustrated in FIG. 11, the analysis process by the corresponding analysis method is performed every time the detection information (vibration data) associated with each sequence number is obtained; however, the present invention is not limited to this example. That is to say, instead of the analysis process in a series of machining cycles, after the machining cycle stops, the analysis process by the analyzing unit 110 may be separately performed using the sequence number and the detection information (vibration data) accumulated in the storage unit 112. However, in the case where the machining cycle needs to be stopped because the abnormality in the tool 23 or the like has been found as a result of the analysis process during the machining process of the machining cycle, it is desirable to perform the analysis process for each machining process.

About Data History Screen, Etc.

Figure 12:
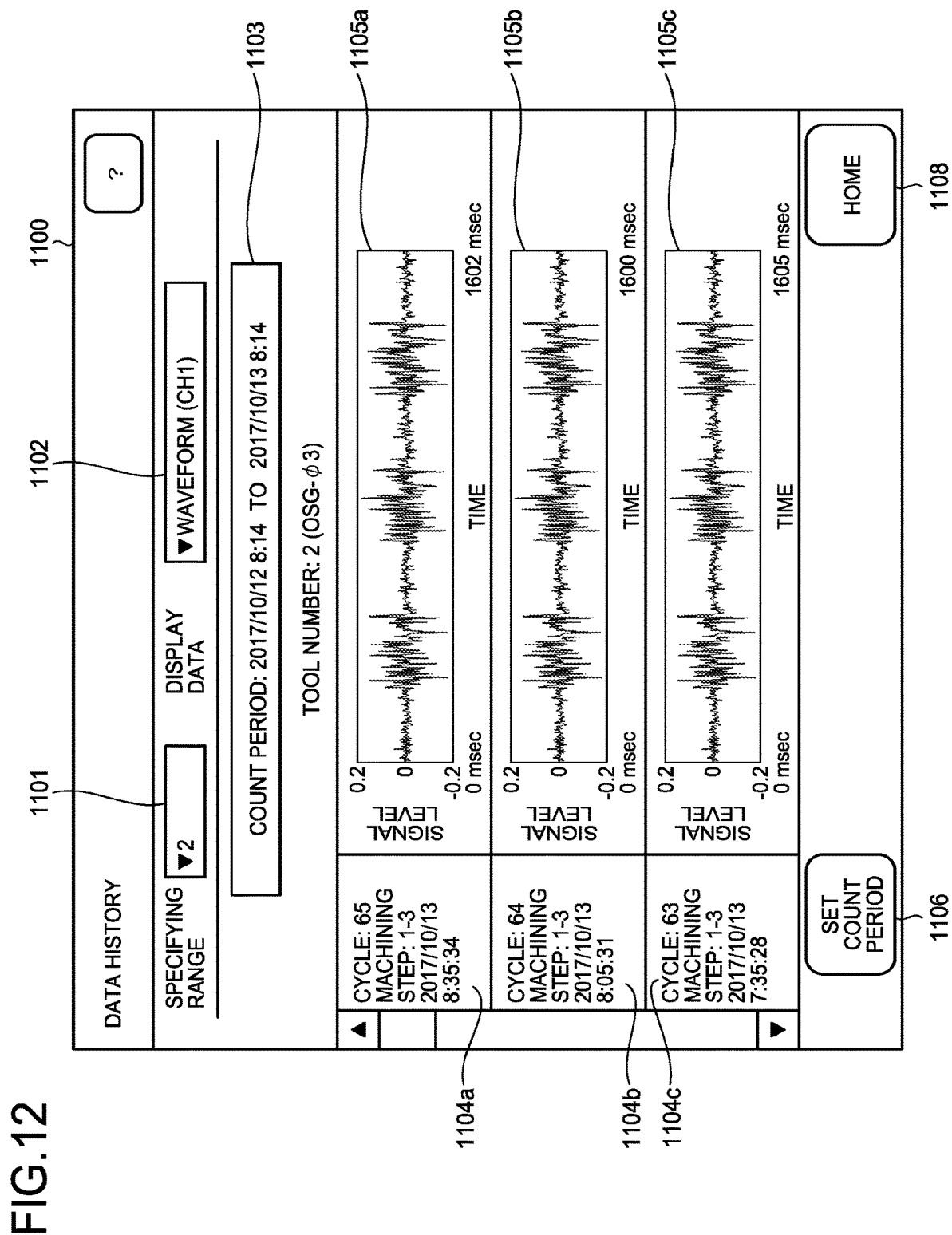
FIG. 12 is a diagram illustrating one example of a data history screen displaying a waveform of the vibration data.
Figure 13:
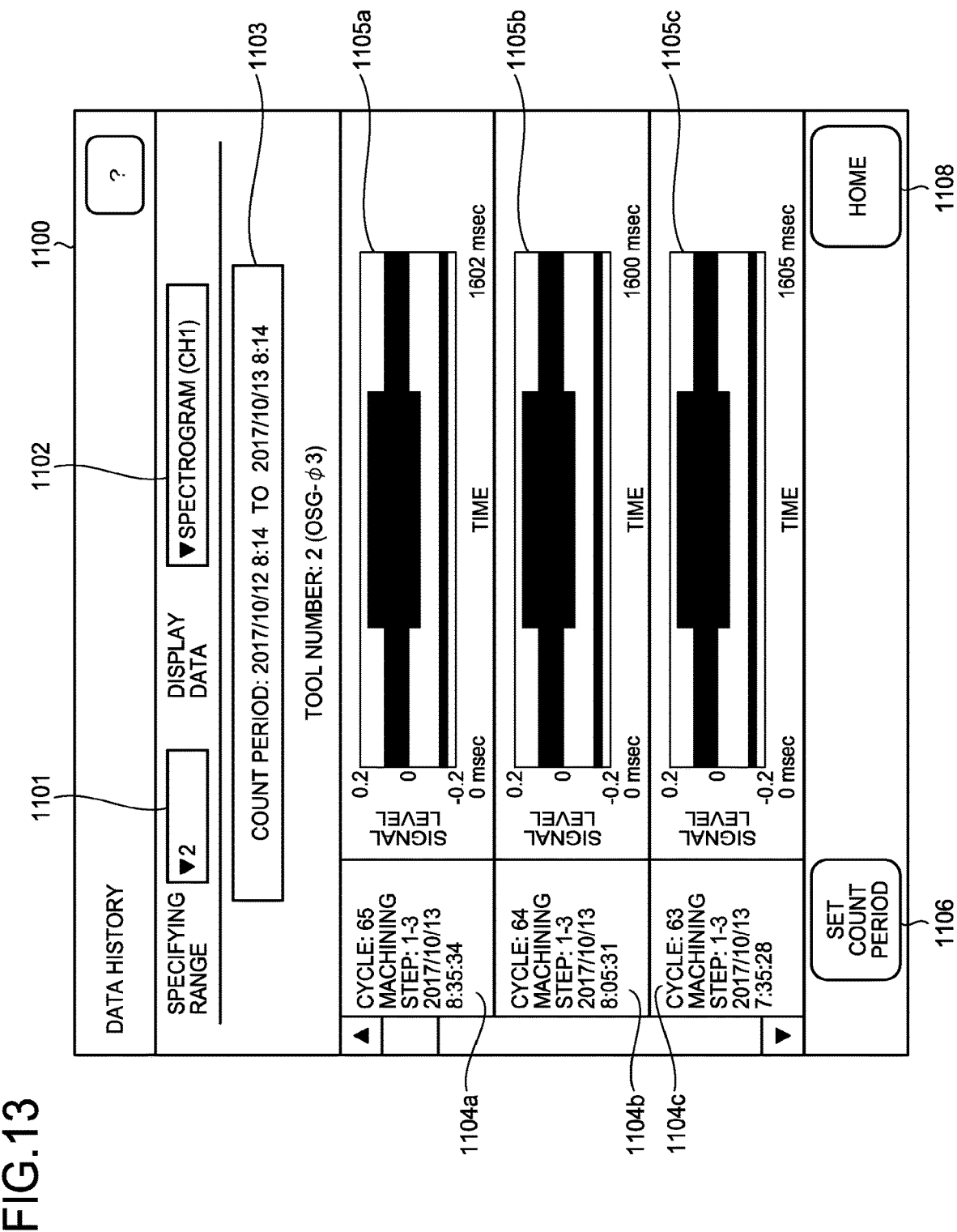
FIG. 13 is a diagram illustrating one example of a data history screen displaying a spectrogram of the vibration data.
Figure 14:
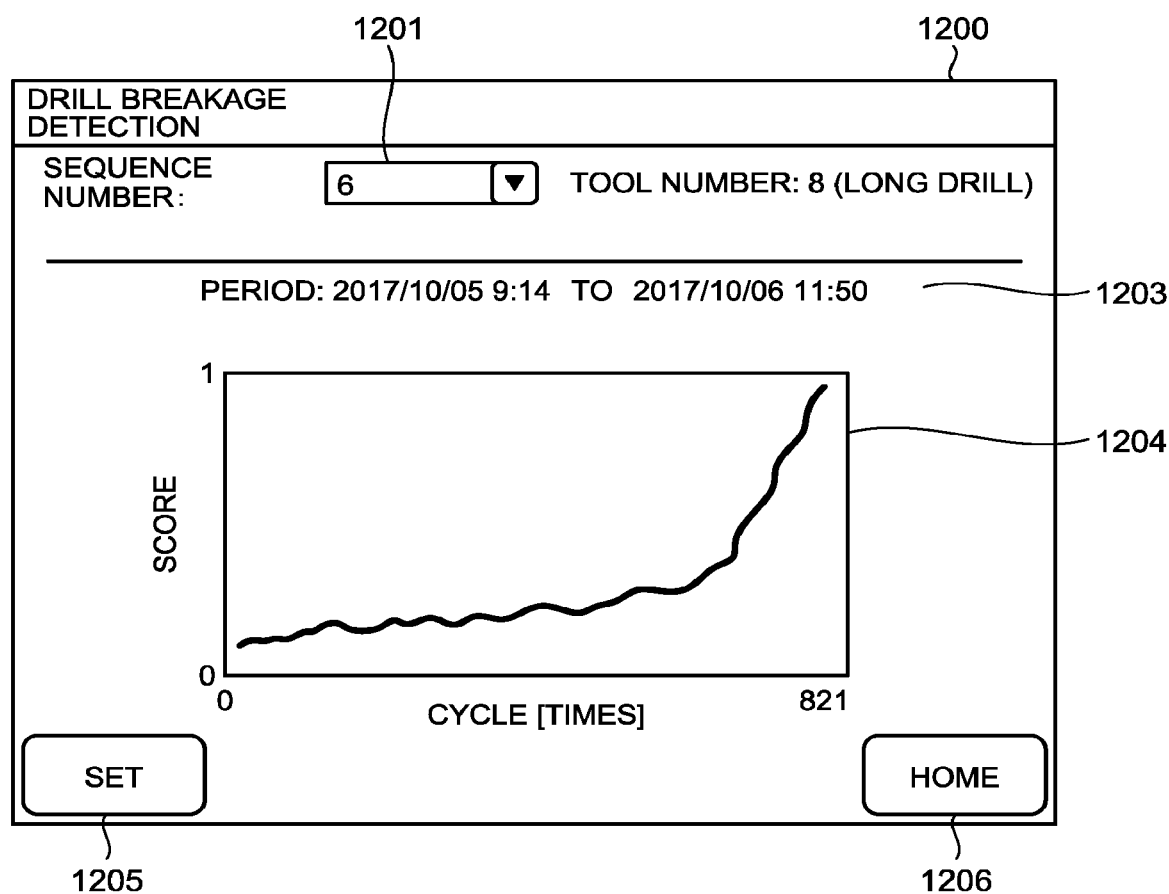
FIG. 14 is a diagram illustrating one example of a drill breakage detection screen displaying a breakage detection score based on the vibration data.

FIG. 12 is a diagram illustrating one example of a data history screen displaying the waveform of the vibration data. FIG. 13 is a diagram illustrating one example of a data history screen displaying a spectrogram of the vibration data. FIG. 14 is a diagram illustrating one example of a drill breakage detection screen displaying a breakage detection score based on the vibration data. With reference to FIG. 12 to FIG. 14, a data history screen 1100 and a drill breakage detection screen 1200 that is a screen similar to the data history screen are described.

The data history screen 1100 illustrated in FIG. 12 is a screen for reading out and displaying the sequence number and the detection information (vibration data) that are accumulated in the storage unit 112 by the data saving control unit 111 and are associated with each other by the associating unit 108, and the information about the result of the analysis process by the analyzing unit 110. The data history screen 1100 is displayed on the display unit 115 by the display control unit 114 in accordance with the user's operation for the input unit 113.

The data history screen 1100 illustrated in FIG. 12 includes a specifying range input unit 1101, a display data input unit 1102, a period display part 1103, vibration data information display parts 1104*a* to 1104*c*, vibration data display parts 1105*a* to 1105*c*, a period setting button 1106, and a home button 1108.

The specifying range input unit 1101 is a box in which the range of the sequence numbers to display the vibration data and the analysis result is specified and input. In the example illustrated in FIG. 12, the sequence number "2" is input.

The display data input unit 1102 is a box where the display format of the vibration data is selected and input. Examples of the display format include the waveform display, the spectrogram display, and the frequency analysis display. In the example illustrated in FIG. 12, the waveform display is selected.

The period display part 1103 is a display area such as a dialog box where the period set as the period of the displayed vibration data is displayed and that is displayed by pressing the period setting button 1106. In the example illustrated in FIG. 12, the vibration data that is displayed is in the period from 2017/10/12 8:14 to 2017/10/13 8:14.

The vibration data information display parts 1104*a* to 1104*c* are the display areas for displaying the information about the vibration data that is displayed. In the vibration data information display part 1104*a* illustrated in FIG. 12, the vibration data that is displayed is the vibration data in the machining process corresponding to the sequence number "2" in the 65th machining cycle and the vibration data corresponding to the steps "1-3" (machining steps 1 to 3), and the date when the vibration data is acquired is "2017/10/13 8:35:34". Note that in order to display the number of cycles, the number of steps, and the date of the machining cycle on the vibration data information display part 1104*a*, for example in the case where the data saving control unit 111 saves the sequence number and the detection information (vibration data) that are associated with each other by the associating unit 108 in the storage unit 112, the data saving control unit 111 may acquire the number of cycles, the number of steps, and the date included in the context information including the corresponding sequence number and save them after associating these pieces of information similarly. As for the date in this case, other than the date acquired from the context information, the date information acquired from the system may be associated with the sequence number or the like and saved.

The vibration data display parts 1105*a* to 1105*c* are the display areas for displaying the vibration data associated with the sequence number specified in the specifying range input unit 1101. In the example illustrated in FIG. 12, the waveform display is selected and input in the display data input unit 1102; therefore, the vibration data is displayed in the waveform format. That is to say, the pieces of vibration data corresponding to the same sequence number are displayed side by side on the data history screen 1100; thus, the data can be compared with each other.

The period setting button 1106 is a button for setting the period of the vibration data to display as described above. The home button 1108 is a button for returning to the home screen.

Assuming that the spectrogram display is selected and input as the display format in the display data input unit 1102, the vibration data associated with the sequence number displayed in each of the vibration data information display parts 1104*a* to 1104*c* is displayed in the spectrogram format in each of the vibration data display parts 1105*a* to 1105*c* on the data history screen 1100 illustrated in FIG. 13.

Note that on the data history screen 1100 illustrated in FIG. 12 and FIG. 13, the information expressing the result of the analysis process for the displayed vibration data may be further displayed. For example, in the case where the analysis method is the abnormal process detection, upon the detection of the waveform part expressing the abnormality in the vibration data in the analysis process, the corresponding waveform part may be displayed in a recognizable manner.

The drill breakage detection screen 1200 illustrated in FIG. 14 that is a screen similar to the data history screen is a screen that displays the result of the analysis process by the drill breakage detection about the vibration data associated with the sequence number in which the analysis method is set as the drill breakage detection. The drill breakage detection screen 1200 is displayed on the display unit 115 by the display control unit 114 in accordance with the user's operation for the input unit 113.

The drill breakage detection screen 1200 illustrated in FIG. 14 includes a sequence number input unit 1201, a period display part 1203, an analysis result display part 1204, a setting button 1205, and a home button 1206.

The sequence number input unit 1201 is a box where the sequence number to display the result of the analysis process of the drill breakage detection is input. The period display part 1203 is a display area for displaying the period in which the analysis result is displayed.

The analysis result display part 1204 is a display area for displaying the score of the drill breakage detection in a time series as a result of analyzing the vibration data associated with the sequence number input to the sequence number input unit 1201 by the drill breakage detection. Here, the score of the breakage detection is, for example, displayed as the value resulted from comparison, which is performed as the drill breakage detection, between the vibration data associated with the sequence number and the vibration data that is a model (normal vibration data). This value increases as the breakage is more likely to occur. Thus, the score increases as the drill (long drill in the example in FIG. 14) that is used as the tool 23 is used more often in the machining cycle as illustrated in FIG. 14. However, the score of the breakage detection may increase suddenly because the possibility of the breakage increases due to abrasion as the drill is used generally, or because of the abnormality of the drill or the abnormality of the machining operation.

The setting button 1205 is a button for setting the display on the drill breakage detection screen 1200. For example, the setting button 1205 may be able to set the period in which the analysis result is displayed.

The home button 1206 is a button for returning to the home screen.

The vibration data associated with the sequence number saved by the data saving control unit 111 and the result of the analysis process for the vibration data are displayed like on the screen illustrated in FIG. 12 to FIG. 14 described above, and by this display, the vibration data with the same sequence number in the past can be compared visually or the analysis result that is displayed in the time series can be checked, so that the tendency of the result can be understood, for example.

As described above, in the diagnosis system 1 according to the present embodiment, the detection information output from the vibration sensor 24 provided independently to the machine tool 20 is associated with the sequence number included in the context information. Thus, since the detection information in the machining process is associated with the sequence number, the detection information can be analyzed for each sequence number and the detection information with the same sequence number in the past can be compared visually and the past analysis result can be checked.

Note that each function of the aforementioned embodiment can be implemented by one or a plurality of processing circuits. Here, the term "processing circuit" refers to a processor that is programmed to execute each function with software such as a processor that is mounted by an electronic circuit, an ASIC (Application Specific Integrated Circuit), a DSP (Digital Signal Processor), an FPGA (Field-Programmable Gate Array), an SOC (System on a chip), or a GPU (Graphics Processing Unit) that is designed to execute the aforementioned functions, or a conventional device such as a circuit module.

In addition, the computer program that is executed in the diagnosis device 10 and the machine tool 20 in the aforementioned embodiment may be recorded as a installable or executable format file in a computer readable recording medium such as a CD-ROM (Compact Disc Read Only Memory), a flexible disk (FD), a CD-R (Compact Disk-Recordable), or a DVD (Digital Versatile Disk) and configured as a computer program product.

The computer program to be executed in the diagnosis device 10 and the machine tool 20 in the aforementioned embodiment may be stored on a computer connected to a network such as the Internet and provided by being downloaded through the network. The computer program to be executed in the diagnosis device 10 and the machine tool 20 in the aforementioned embodiment may be provided or distributed through a network such as the Internet.

Furthermore, the computer program to be executed in the diagnosis device 10 and the machine tool 20 in the aforementioned embodiment has a module structure including the aforementioned function units, and as actual hardware, a CPU (processor) reads out and executes the computer program from the aforementioned ROM so as to load the units on a main storage device, and thus the units are generated on the main storage device.

According to an embodiment, the data output from the external sensor installed for the machine tool independently is associated with the monitoring specifying number about the machining process, so that the data can be analyzed for each monitoring specifying number.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A diagnosis device, comprising:
    circuitry configured to:
        acquire, from a machine tool, context information including at least a monitoring specifying number identifying a specified machining process among a plurality of machining processes performed in an order and specifying a place of the specified machining process in the order;
        acquire, from the machine tool via an analog-to-digital converter and in a transmission separate from that including the context information, an operation signal which indicates that the specified machining process is being performed in the machine tool;
        acquire detection information output from a sensor installed for the machine tool, the detection information being extracted and corresponding to a period in which the operation signal is acquired;
        associate, at a standby time or more after acquisition of the operation signal is started, the monitoring specifying number included in the context information with the detection information;
        detect an abnormality in the detection information; and
        control the machine tool in accordance with the abnormality, wherein
    a certain time is taken until the monitoring specifying number is reflected in the context information, and
    the standby time is set to be at least the certain time.

2. The diagnosis device according to claim 1, wherein the monitoring specifying number is inserted in a machining program for implementing the specified machining process in the machine tool.

3. The diagnosis device according to claim 2, wherein the circuitry is further configured to set a certain monitoring specifying number of the monitoring specifying number inserted in the machining program in accordance with an operation for an input.

4. The diagnosis device according to claim 3, wherein the circuitry is further configured to:

set association between the certain monitoring specifying number of the monitoring specifying number inserted in the machining program, and an analysis method for the detection information in accordance with the operation for the input; and implement an analysis unit configured to perform an analysis process on the detection information, in accordance with the analysis method associated with the monitoring specifying number associated with the detection information.

5. The diagnosis device according to claim 4, wherein the circuitry is further configured to:
save, in a storage, the monitoring specifying number and the detection information associated with each other by the associating unit; and
display, on a display, pieces of the detection information associated with the same monitoring specifying number side by side.

6. The diagnosis device according to claim 1, wherein the circuitry is further configured to:
save, in a storage, an analysis result from an analysis process of the detection information associated with a particular monitoring specifying number, the analysis process being performed in accordance with the analysis method associated with the particular monitoring specifying number; and
display, on a display, the analysis result saved in the storage.

7. The diagnosis device according to claim 5, wherein the storage is included in an external server device or a cloud.

8. The diagnosis device according to claim 1, wherein the sensor includes a vibration sensor, and
the detection information includes vibration data detected by the vibration sensor.

9. A diagnosis system, comprising:
a machine tool configured to perform a machining process on a machining target; and
a diagnosis device configured to diagnose an operation of the machine tool,
the machine tool comprising a transmission circuitry configured to transmit, to the diagnosis device, context information including at least a monitoring specifying number identifying a specified machining process among a plurality of machining processes performed in an order and specifying a place of the specified machining process in the order, and the diagnosis device comprising circuitry configured to:
acquire the context information from the machine tool;
acquire, from the machine tool via an analog-to-digital converter and in a transmission separate from that including the context information, an operation signal which indicates that the specified machining process is being performed in the machine tool;
acquire detection information output from a sensor installed for the machine tool, the detection information being extracted and corresponding to a period in which the operation signal is acquired;
associate, at a standby time or more after acquisition of the operation signal is started, the monitoring specifying number included in the context information with the detection information;
detect an abnormality in the detection information; and
control the machine tool in accordance with the abnormality, wherein
a certain time is taken until the monitoring specifying number is reflected in the context information, and
the standby time is set to be at least the certain time.

10. A non-transitory computer-readable medium including programmed instructions that cause a computer to perform:
acquiring, from a machine tool, context information including at least a monitoring specifying number identifying a specified machining process among a plurality of machining processes performed in an order and specifying a place of the specified machining process in the order;
acquiring, from the machine tool via an analog-to-digital converter and in a transmission separate from that including the context information, an operation signal which indicates that the specified machining process is being performed in the machine tool;
acquiring detection information output from a sensor installed for the machine tool, the detection information being extracted and corresponding to a period in which the operation signal is acquired;
associating, at a standby time or more after acquisition of the operation signal is started, the monitoring specifying number included in the acquired context information with the acquired detection information;
detecting an abnormality in the detection information; and
controlling the machine tool in accordance with the abnormality, wherein
a certain time is taken until the monitoring specifying number is reflected in the context information, and
the standby time is set to be at least the certain time.

* * * * *